Sept. 13, 1927.  C. E. MAYNARD  1,642,456
TUBE END BEVELING AND SEALING DEVICE
Filed Nov. 30, 1926

INVENTOR.
BY Charles Edgar Maynard
Edward C. Taylor
ATTORNEY.

Patented Sept. 13, 1927.

1,642,456

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

TUBE-END BEVELING AND SEALING DEVICE.

Application filed November 30, 1926. Serial No. 151,640.

This invention relates to the manufacture of rubber tubes particularly such as are designed for use as inner tubes for pneumatic tire casings. It has particular reference to the production of beveled ends on such tubes before they are bent into endless form and spliced, and to a device for simultaneously beveling the ends of such a tube and sealing them to the mandrel upon which it is vulcanized. It is the object of the invention to produce a straight bevel on the end of the tube in contrast with the blunt or rounded bevel produced by certain prior art devices.

Referring to the drawings.

It has been customary in the manufacture of inner tubes to mount them upon a cylindrical mandrel, either straight or bent into circular or spiral form, and to bind the ends of the tube to the mandrel by some sort of device which simultaneously seals the ends of the tube against ingress of steam and bevels or tapers the ends of the tube. This bevel or taper of the tube ends is desirable since the tube is later spliced into endless form and the bevel prevents any abrupt change in thickness of the tube at the splice.

Figure 1:
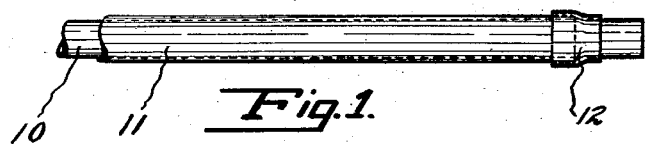
Fig. 1 is a view of a tube mounted upon a vulcanizing mandrel showing a tube end beveling and sealing device in place.
Figure 2:
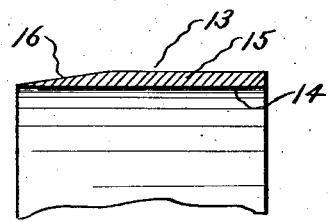
Fig. 2 is a side view partly in section showing a beveling and sealing device as formerly constructed.
Figure 3:
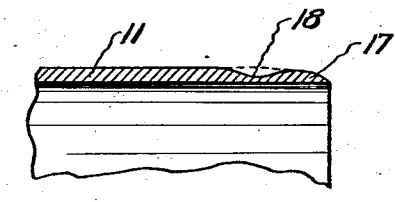
Fig. 3 is a detail of the end of a tube after having been vulcanized by the use of the device shown in Fig. 2.

In Fig. 1 a mandrel has been shown at 10 with a tube 11 mounted upon it ready for vulcanization. The tube sealing device shown at 12 is in this case drawn in accordance with the disclosure of Fig. 4; but in the prior art has been constructed either as a skived ring 13, shown in Fig. 2, or as a helical wrapping of tape. The tape both sealed and beveled the end of the tube but did not produce a smooth appearing piece of work. In spite of this the taping method of beveling the tube end has been used for many years particularly upon straight mandrels. Where the tubes are vulcanized upon circular mandrels the use of tape is not quite so easy as the tape must be put on by hand or by more complicated machinery than is needed where the tubes are cured upon straight mandrels. As an alternative to this method of manufacture, the skived ring 13, shown in Fig. 2, or a metal clamp such as is shown in Patents 1,391,784 granted September 27, 1921 or 1,450,320, granted April 3, 1923, has been used. This ring 13 had a cylindrical bore 14 and a body portion 15 of generally uniform thickness, but with an outside taper 16 at one end. The skived ring was mounted upon the mandrel and tube as shown in Fig. 1 with the tapered portion 16 directed toward the tube and the body portion 15 resting in part upon the mandrel. The ring 13 was constructed of vulcanized rubber and of a diameter less than the diameter of the mandrel 10 so that during the cure it exerted a steady compressive force upon the tube end gradually decreasing from the end towards the body of the tube due to the skived end 16. The result of the use of such a skived ring upon the tube during vulcanization is shown in Fig. 3. It will be observed that the tube has a blunt end 17. The use of a ring of this character always produces the blunt end 17, and may produce either a recess 18 or the form shown in dotted lines in Fig. 3, depending upon the length of the tapered portion 16. Perhaps the reason for this action can be described better after my improved type of clamp has been submitted.

Figure 4:
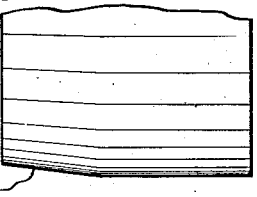
Fig. 4 is a sectional view corresponding to the upper portion of Fig. 2, but showing my improved beveling and sealing device.
Figure 6:
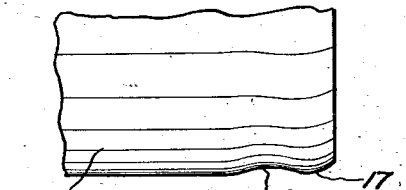
Fig. 6 is a view similar to Fig. 3, but showing the result of using the device illustrated in Fig. 4.
Figure 5:
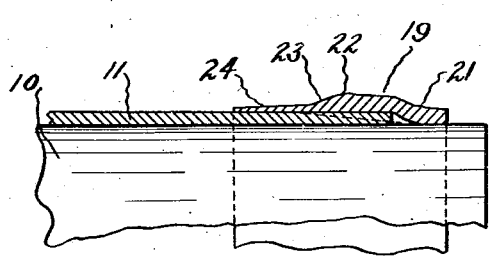
Fig. 5 is a detail showing my improved device in place upon a tube.

A clamp constructed in accordance with my invention is shown in Fig. 4. It will be seen that this comprises a molded ring 19 having a cylindrical bore 20. The outer surface of the ring is formed with a gradual taper 21 leading up to a point of maximum thickness 22, which in turn tapers off suddenly at 23 and merges into a gradual taper 24. When such a ring is stretched the region 22 of greatest thickness will be the hardest to stretch and therefore will exert the maximum contractive force. This is illustrated in Fig. 5 which shows the device mounted upon the end of a tube. The tube end is shown in full line in this figure before the clamp has begun to mold the soft rubber of the tube and in dotted line after this molding has been completed. The easiest point of the tube end to mold is the very end since, as is clearly shown in this figure, this portion of the rubber is supported only at one side. It can be pressed down toward the mandrel and have a slight flow toward the right in Fig. 5 unrestrained except by the natural reluctance of the rubber to flow. The resistance to molding offered by the rubber of the tube end increases as the end of the tube is left until the maximum resistance is offered at a point about under the numeral 22 in this figure. By my improved device the pressure is proportioned as required by the resistance offered by the tube and the difficulties experienced by the use of the ring shown in Fig. 2 are avoided. This latter form of ring exerts a uniform pressure (except at the short tapered end) on account of the uniform thickness of the body of the rubber band. The uniform pressure, however, produces a non-uniform effect due to the lack of uniformity in the resistance to flow offered by the tube end. In consequence, the point at the end of the tube where the flow is easiest will be beveled abruptly as in Fig. 3. The device of Fig. 4, however, exerts a non-uniform pressure which coacts with the non-uniform resistance to flow of the tube end to produce a uniformly tapered bevel 25 as shown in Fig. 6, which is exactly the condition desired for splicing.

Having thus described my invention, I claim:

1. A tube end beveling and sealing device constructed of a molded ring of vulcanized rubber having a substantially cylindrical bore and tapering in cross-section from an intermediate zone toward each end.

2. A tube end beveling and sealing device constructed of a molded ring of vulcanized rubber having a substantially cylindrical bore and tapering in cross-section from an intermediate zone towards each end, one end being thinner than the other.

3. The process of making a rubber tube having a straight beveled end which comprises applying to the end of the tube a pressure decreasing in each direction from a maximum at a circumference located midway of the bevel to be produced.

4. The process of making a rubber tube having a straight beveled end which comprises applying to the end of the tube a pressure decreasing in each direction from a maximum at a circumference located midway of the bevel to be produced, and vulcanizing the tube while maintaining said pressure.

5. A tube end beveling and sealing device constructed of a ring of resilient material having a thickness intermediate its ends greater than the thickness adjacent either end.

6. A tube end beveling and sealing device constructed of a ring of resilient material having one tapered end and an intermediate section of greater thickness than the thickness adjacent either end.

7. A tube end beveling and sealing device constructed of a ring of resilient material having an intermediate portion possessing greater contractive force when the ring is stretched than the portions of the ring adjacent either end.

CHARLES EDGAR MAYNARD.